United States Patent
Maggard

(10) Patent No.: US 9,924,622 B2
(45) Date of Patent: Mar. 27, 2018

(54) VERTICAL TINE TILLER

(71) Applicant: MTD Products Inc, Valley City, OH (US)

(72) Inventor: Jay Maggard, Seven Hills, OH (US)

(73) Assignee: MTD PRODUCTS INC, Valley City, OH (US)

( * ) Notice: Subject to any disclaimer, the term of this patent is extended or adjusted under 35 U.S.C. 154(b) by 0 days.

(21) Appl. No.: 14/955,617

(22) Filed: Dec. 1, 2015

(65) Prior Publication Data

US 2016/0150713 A1 Jun. 2, 2016

Related U.S. Application Data

(60) Provisional application No. 62/086,367, filed on Dec. 2, 2014.

(51) Int. Cl.
| | |
|---|---|
| *A01B 33/06* | (2006.01) |
| *A01B 33/08* | (2006.01) |
| *A01B 33/10* | (2006.01) |
| *A01B 33/02* | (2006.01) |

(52) U.S. Cl.
CPC ............ *A01B 33/06* (2013.01); *A01B 33/028* (2013.01); *A01B 33/065* (2013.01); *A01B 33/085* (2013.01); *A01B 33/106* (2013.01)

(58) Field of Classification Search
CPC ..... A01B 33/06; A01B 33/065; A01B 33/085; A01B 33/106; A01B 17/008; A01B 21/06; A01B 33/146; A01B 49/025; A01B 33/148
USPC ...................... 172/49.5, 59, 110, 111, 42, 43
See application file for complete search history.

(56) References Cited

U.S. PATENT DOCUMENTS

| | | | | |
|---|---|---|---|---|
| 1,506,042 A | * | 8/1924 | Bauer | A01B 33/06 172/43 |
| 1,592,825 A | * | 7/1926 | Gardner | A01B 39/085 172/116 |
| 2,050,120 A | * | 8/1936 | Pizarro | A01B 33/065 172/490 |
| 2,410,273 A | * | 10/1946 | Deubner | A01B 33/06 172/111 |
| 2,545,173 A | | 3/1951 | Franklin | |

(Continued)

FOREIGN PATENT DOCUMENTS

| | | |
|---|---|---|
| CA | 2 874 485 | 11/2013 |
| CN | 1378421 | 11/2002 |

(Continued)

OTHER PUBLICATIONS

International Search Report and Written Opinion for International Patent Application No. PCT/US2015/063198 dated Mar. 10, 2016.

(Continued)

*Primary Examiner* — Matthew D. Troutman
(74) *Attorney, Agent, or Firm* — Wegman, Hessler & Vanderburg

(57) ABSTRACT

A vertical tine tiller having vertically oriented tine assemblies that are configured to rotate about vertical axes is provided. The tiller includes a power source that drives a horizontally-aligned driveshaft, which can selectively drive a transmission assembly. Horizontal rotation of the driveshaft is directly transferred into vertical rotation of a pair of drive rods to which the tine assemblies are attached.

13 Claims, 13 Drawing Sheets

(56) References Cited

U.S. PATENT DOCUMENTS

| | | | |
|---|---|---|---|
| 2,582,364 A | | 1/1952 | Tice |
| 3,129,772 A | * | 4/1964 | Anderson ............ A01B 39/085 172/111 |
| 3,939,918 A | | 2/1976 | Van der Lely |
| 3,945,441 A | | 3/1976 | Van der Lely et al. |
| 4,049,059 A | * | 9/1977 | Weibling ............... A01G 3/062 172/15 |
| 4,072,196 A | | 2/1978 | Van der Lely |
| 4,164,259 A | * | 8/1979 | van der Lely ......... A01B 33/12 172/49.5 |
| 4,335,790 A | * | 6/1982 | van der Lely ......... A01B 33/12 172/112 |
| 4,363,362 A | * | 12/1982 | Barato ................. A01B 33/065 172/117 |
| 4,519,459 A | * | 5/1985 | Reaume ............... A01B 33/082 172/125 |
| 4,552,223 A | * | 11/1985 | van der Lely ....... A01B 33/065 172/49.5 |
| 4,567,949 A | * | 2/1986 | Herscher .............. A01B 33/082 172/125 |
| 6,470,766 B2 | * | 10/2002 | Ohta ........................ E01H 5/04 74/411 |
| 6,763,895 B1 | | 7/2004 | Wilkinson |
| 6,945,333 B1 | * | 9/2005 | Drost ................... A01B 33/028 172/42 |
| 7,000,707 B2 | * | 2/2006 | Oota .................... A01B 33/082 172/125 |
| 9,480,196 B2 | * | 11/2016 | Obrzut ................ A01B 33/106 |
| 2015/0144363 A1 | | 5/2015 | Obrzut et al. |

FOREIGN PATENT DOCUMENTS

| | | |
|---|---|---|
| CN | 104602508 | 5/2015 |
| DE | 588916 | 11/1933 |
| DE | 891 633 | 10/1953 |
| DE | 1136864 | 9/1962 |
| DE | 2635827 | 2/1977 |
| EP | 2 852 272 | 5/2015 |
| GB | 369423 | 3/1932 |
| GB | 1 520 135 | 8/1978 |
| WO | 01/17329 | 3/2001 |
| WO | 2013/177406 | 11/2013 |

OTHER PUBLICATIONS

Canadian Office Action for corresponding Canadian patent application No. 2,874,485 dated Dec. 18, 2015.

First Office Action for corresponding Chinese Application No. 201380030422.7 dated Jan. 29, 2016.

International Search Report and Written Opinion for related International Patent Application No. PCT/US2013/042438 dated Oct. 10, 2013.

* cited by examiner

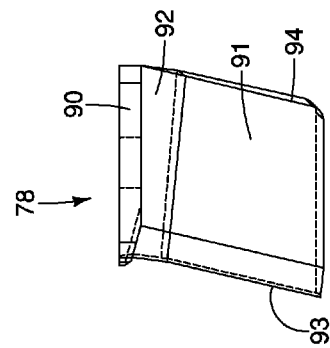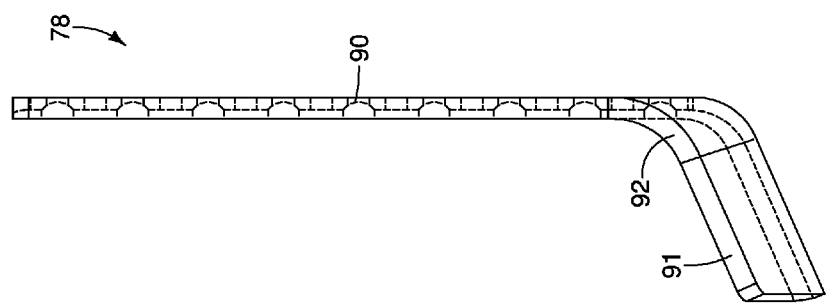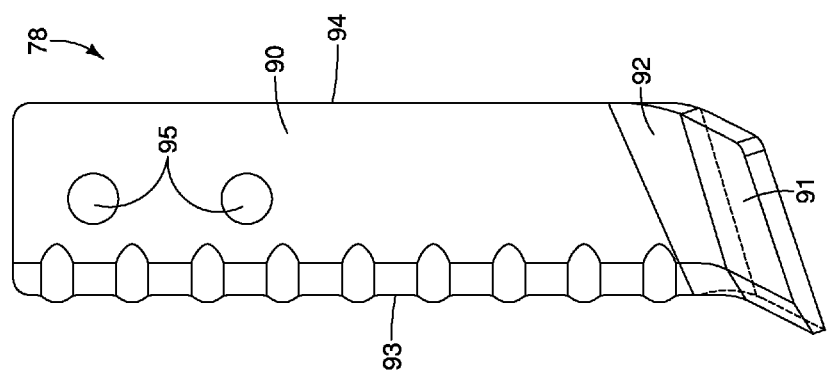

VERTICAL TINE TILLER

CROSS REFERENCE TO RELATED APPLICATION

This application claims the priority benefit of U.S. Provisional Patent Application Ser. No. 62/086,367 filed Dec. 2, 2014.

FIELD OF THE INVENTION

The present invention is directed to yard machinery, and more particularly, to a ground tiller.

BACKGROUND OF THE INVENTION

Yard tillers for tilling or grinding up sections of turf and dirt in a yard are commonly known. Typical tillers include an engine or other power supply mounted on a frame having a pair of laterally-aligned tires having a substantially horizontal axle extending therebetween. The horizontal axle is operatively connected to a chassis, and an engine for powering the tines of the tiller is attached to the chassis. Handles for controlling the tiller extend rearwardly from the chassis, typically rearward of the engine. Conventional tillers have a transmission transfer case extending downwardly from the engine toward the ground, and the transfer case includes either two laterally-extending drive shafts that are oriented substantially parallel to the ground with a tine assembly attached to each drive shaft or a single drive shaft extending from the transfer case in which two or more tine assemblies are attached to the single drive shaft. The transfer case receives rotational power from the engine and provides output rotational power to the horizontal drive shaft(s), thereby changing the longitudinal axis of rotational power from the engine by 90°. Each tine assembly typically includes two to five tines or augers attached and extending from a body, wherein the body is attached directly to a drive shaft such that rotation of the drive shaft causes the body and tines to rotate.

Typical tine assemblies are configured such that the tines rotate about the horizontally-aligned drive shaft(s) in such a manner that the tines are continually rotating away from the operator of the tiller. Such rotational movement of the tines results in the tines rotating forwardly, contacting the ground or dirt, digging into the hardened ground or loose dirt and pulling it rearwardly as the tine rotates rearwardly, then releases the loosened dirt as the tine begins the rotation forwardly over the top of the drive shaft again. This forward rotation of the tines about a horizontal axis tends to pull the tiller forward such that as the tines contact hardened soil that has not yet been loosened by the tines, the tines strike the hardened ground and cause the entire tiller to jolt or jerk. Because the operator is typically using the tiller to ground up and loosen an entire patch of ground, this continuous jerking and jolting action of the tiller requires the operator to maintain an extremely firm grasp on the handles to ensure that the tiller does not lurch forward excessively or tip sideways if the operator loses grip of the handles. Accordingly, the use of conventional tillers requires substantial and continuous physical exertion by an operator to maintain the tiller in an upright position to effectively loosen the soil, which results in the operator's arms becoming tired rather quickly as well as the residual effects of the continuous jolting of the tiller as the tines contact hardened soil.

Therefore, there exists a need for a tiller that reduces or eliminates the continuous jerking and jolting action resulting from the tines or augers contacting compacted or hardened soil during use. There also exists a need for a tiller that lessens the required physical strength and exertion for a user to maintain the tiller in an operative position over an extended period of use of the tiller.

BRIEF SUMMARY OF THE INVENTION

In one aspect of the present invention, a vertical tine tiller is provided. The vertical tine tiller includes a frame and an operator control assembly extending from the frame. The vertical tine tiller further including a power source for generating a rotational output, and the power source is operatively connected to the frame. A transfer casing is also operatively connected to the frame. A pair of wheels are operatively connected to the transfer casing. The wheels are rotatable relative to the transfer casing. The vertical tine tiller also includes a tiller assembly rotatably driven by the power source. At least a portion of the tiller assembly is located within the transfer casing. The tiller assembly includes a horizontally rotatable driveshaft operatively connected to power source. A pair of vertically rotatable drive rods are operatively connected to the driveshaft, and a tine assembly is operatively connected to each of the drive rods. Horizontal rotation of the driveshaft is directly transferred into vertical rotation of the drive rods In another aspect of the present invention, a vertical tine tiller is provided. The vertical tine tiller includes a frame, an operator control assembly extending rearwardly from the frame, and a power source for generating a rotational output. The power source is operatively connected to the frame. A tiller assembly is operatively connected to the frame wherein the tiller assembly extends rearwardly from the frame. The tiller assembly is rotatably driven by the power source. The tiller assembly includes a pair of vertically rotatable drive rods, and a tine assembly is operatively connected to each of the drive rods. Each of the tine assemblies is rotatable about a substantially vertical axis. A pair of rotatable wheels are operatively connected to the frame.

In yet another aspect of the present invention, a tine assembly attachable to a vertically-aligned drive rod of a tiller assembly of a vertical tine tiller is provided. The tine assembly includes an upper plate, a lower plate oriented substantially parallel to the upper plate, and a plurality of mounting brackets operatively connecting the upper and lower plates. The tine assembly further includes a hub extending centrally between the upper and lower plates for receiving the vertically-aligned drive rod. A vertically-oriented tine is attached to each of the mounting brackets.

Advantages of the present invention will become more apparent to those skilled in the art from the following description of the embodiments of the invention which have been shown and described by way of illustration. As will be realized, the invention is capable of other and different embodiments, and its details are capable of modification in various respects.

BRIEF DESCRIPTION OF SEVERAL VIEWS OF THE DRAWINGS

These and other features of the present invention, and their advantages, are illustrated specifically in embodiments of the invention now to be described, by way of example, with reference to the accompanying diagrammatic drawings, in which:

FIG. 8B is a front view of the tine shown in FIG. 8A;

FIG. 8C is a side view of the tine shown in FIG. 8A; and

FIG. 8D is a top view of the tine shown in FIG. 8A.

Figure 1:
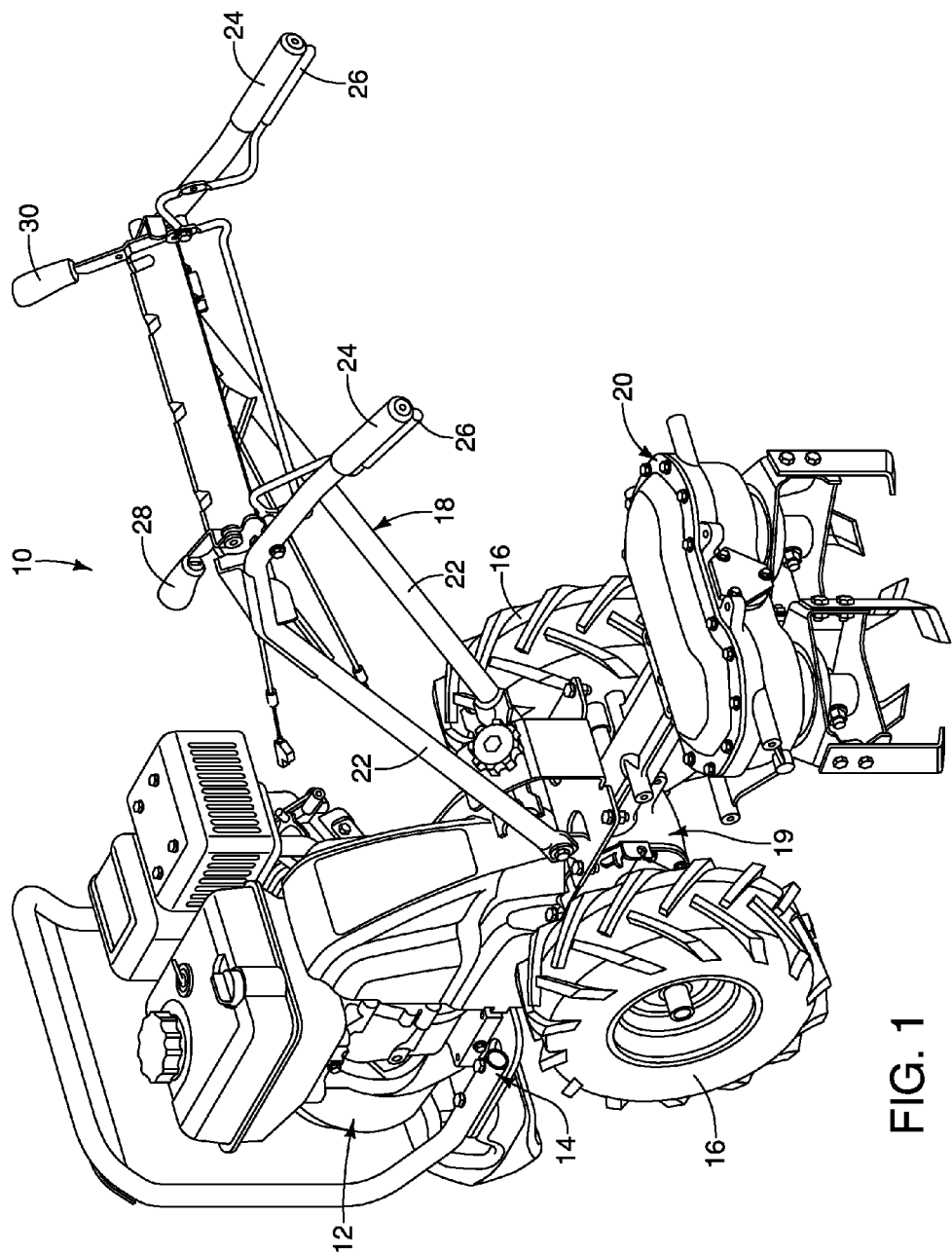
FIG. 1 is a rear perspective view of an embodiment of a vertical tine tiller.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION OF THE PREFERRED EMBODIMENT

Referring to FIG. 1, an exemplary embodiment of a vertical tine tiller 10 is shown. The vertical tine tiller 10 includes a power source 12, a frame 14, at least two rotatable wheels 16 rotatably connected to the frame 14, an operator control assembly 18, a transmission assembly 19 for driving the wheels 16, a transfer casing 40, and a tiller assembly 20. The power source 12 is attached to the frame 14 for stability. The power source 12 can be any gas- or fuel-powered engine, electric motor, a combination thereof, or any other type of commonly known power sources that can generate a rotational output. The illustrated embodiment of the vertical tine tiller 10 includes an engine configured to provide a rotational output, as will be discussed below.

The frame 14 is a substantially rigid combination of members attached to each other to provide a solid base to which the components of the vertical tine tiller 10 can be attached. The vertical tine tiller 10 includes a pair of wheels 16 rotatably connected to the frame 14, as shown in FIG. 1, wherein the wheels 16 may be either movable by pushing/pulling by the operator or driven by way of a transmission (not shown) operatively connected to the frame 14.

Figure 2:
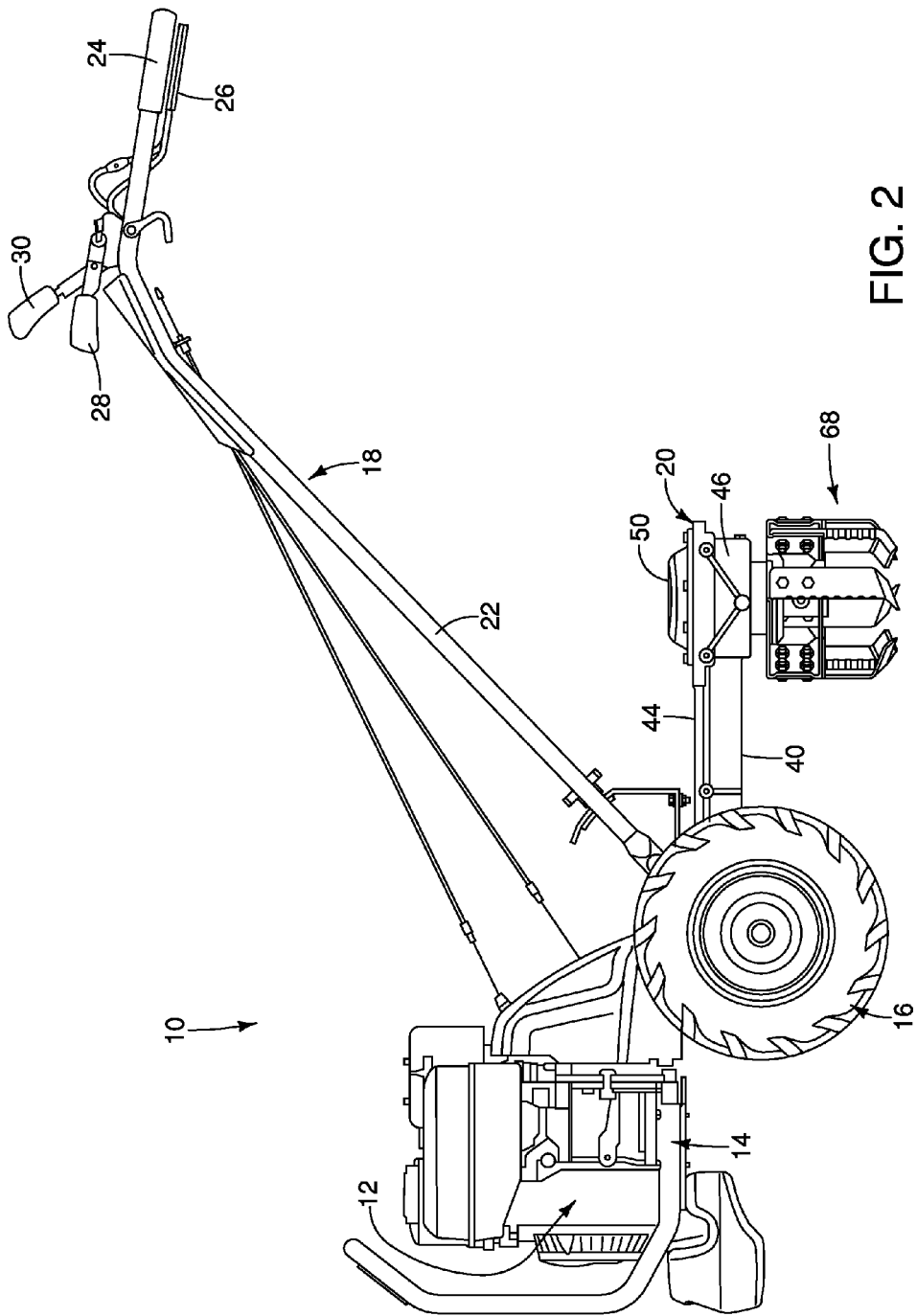
FIG. 2 is a side view of the vertical tine tiller shown in FIG. 1.
Figure 6A:
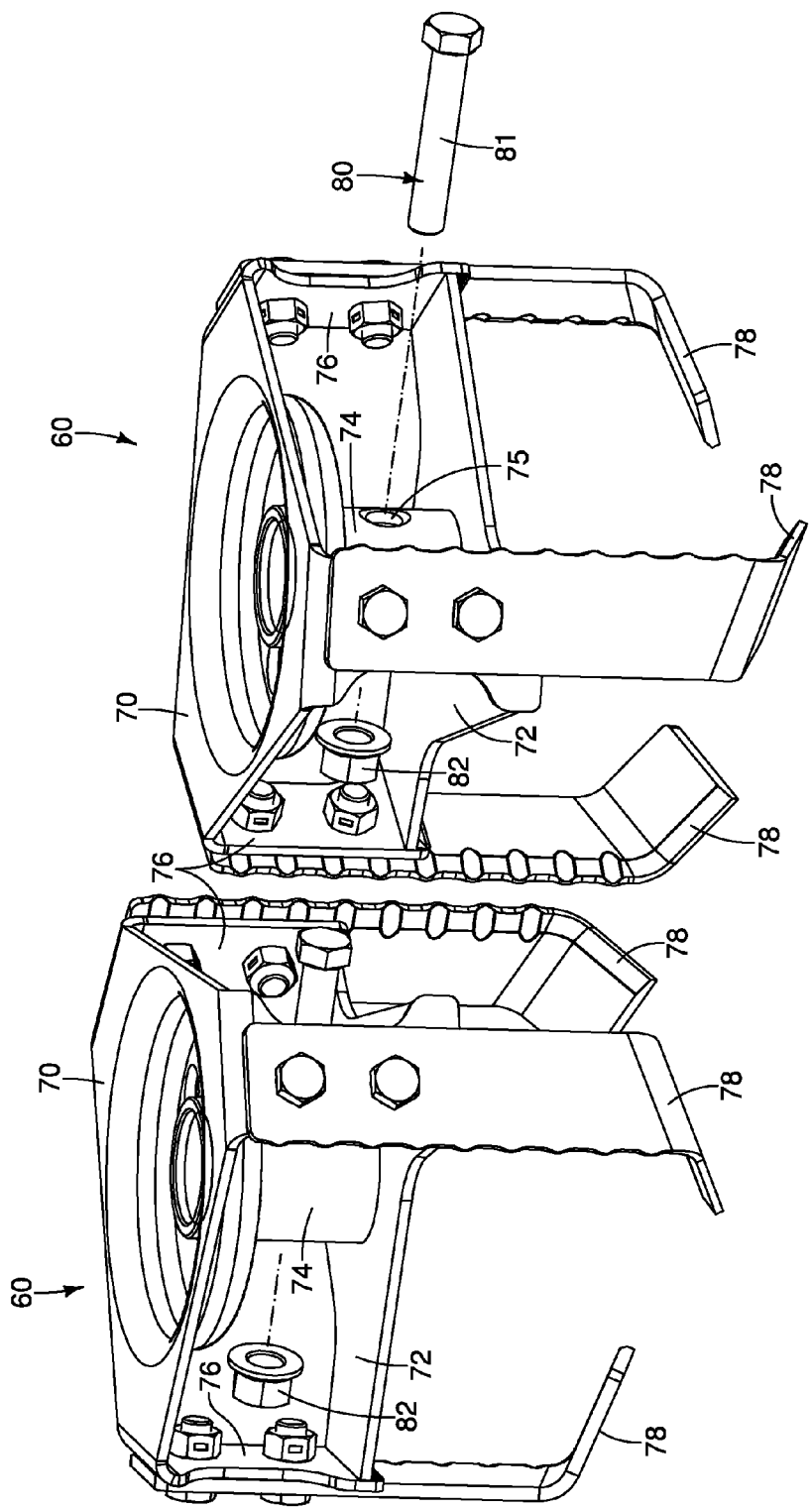
FIG. 6A is a perspective view of a pair of tine assemblies.
Figure 6B:
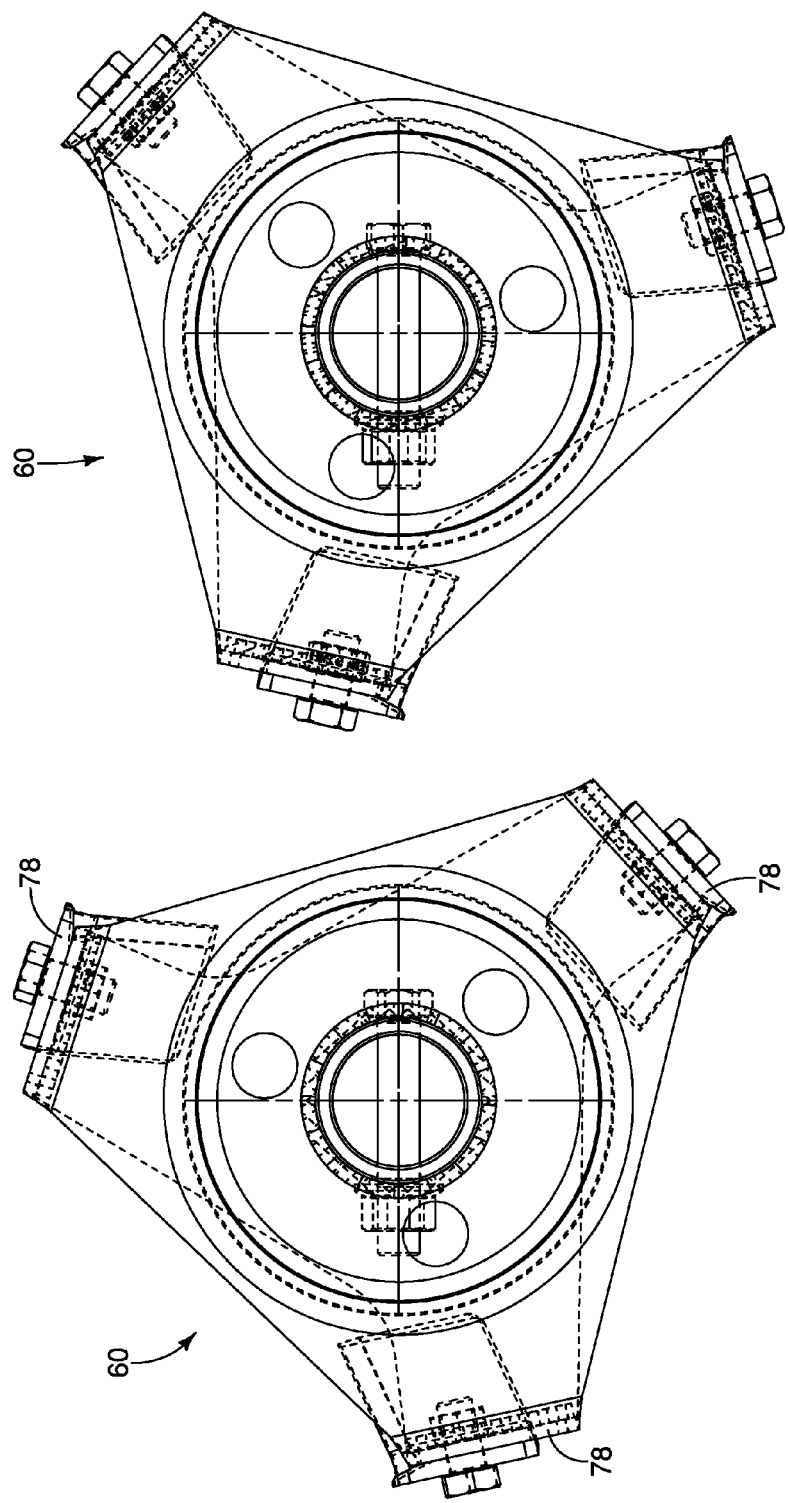
FIG. 6B is a top view of the tine assemblies shown in FIG. 6A.

The operator control assembly 18 of the exemplary embodiment, shown in FIGS. 1-2, includes a pair of arms 22 extending from the frame 14. Each arm 22 includes a grip 24 positioned at the end of the arm 22. The operator control assembly 18 further includes a plurality of switches and levers that allow the operator to control the operation of the power source 12, transmission for powering the wheels 16, and the tiller assembly 20. Each of the switches and levers is positioned to allow the operator to be able to easily control the particular component or assembly while still being able to maintain control of the vertical tine tiller 10. For example, a pair of forward transmission engagement levers 26 having a pair of graspable extensions are located beneath each of the grips 24 to allow the operator to be able to squeeze either or both of the forward transmission engagement levers 26 while simultaneously grasping the corresponding grip 24. The forward transmission engagement lever(s) 26 is configured to engage or disengage the transmission which provides torque to both of the wheels 16 as well as rotational movement to the tine assemblies 60 (FIGS. 6A-6B). When either of the forward transmission engagement levers 26 is actuated, the transmission becomes engaged in the forward direction. The engaged transmission drives the tine assemblies 60 while the forward transmission engagement levers 26 are actuated. Additionally, when the forward transmission engagement levers 26 are actuated, forward rotational torque is applied to the wheels 16 if the wheel engagement lever 28 is also actuated at the same time. However, if the forward transmission engagement lever 26 is actuated but the wheel engagement lever 28 is not actuated, there is no rotational torque applied to the wheels 16.

The illustrated embodiment of the operator control assembly 18 also includes a wheel engagement lever 28 located within easy reach of the grip 24, as shown in FIGS. 1-2. The wheel engagement lever 28 is a rotatable lever that allows the operator to selectively control the engagement and disengagement between the transmission and the wheels 16 for moving the tiller 10. Pulling the wheel engagement lever 28 rearwardly with the forward transmission engagement lever 26 engaged causes the transmission to engage with the wheels 16, which causes the wheels to rotate forwardly and drive the tiller 10. Movement of the wheel engagement lever 28 forwardly causes the transmission to become disengaged from the wheels 16.

The operator control assembly 18, shown in FIGS. 1-2, further includes a reverse transmission engagement lever 30. The reverse transmission engagement lever 30 is located within easy reach of the grip 24. The reverse transmission engagement lever 30 is operatively connected to the transmission assembly 19 by way of a wire located within a protective sheath. The reverse transmission engagement lever 30 allows the operator to selectively engage or disengage the transmission in the reverse direction. When the reverse transmission engagement lever 30 is pulled rearwardly, the transmission is engaged in the reverse direction which causes the tine assemblies 60 to rotate in the opposite direction than when the forward transmission engagement lever 26 is actuated. If the wheel engagement lever 28 is actuated, the wheels 16 are also driven rearwardly by the transmission assembly 19. If the wheel engagement lever 28 is not actuated, then only the tine assemblies 60 are engaged with and driven by the transmission. In short, when either the forward transmission engagement lever 26 or the reverse transmission engagement lever 30 is actuated, torque will be applied to the tine assemblies 60 to drive the tiller function. The transmission only engages the wheels to drive the wheels forwardly or rearwardly is by actuation of the wheel engagement lever 28.

Figure 3:
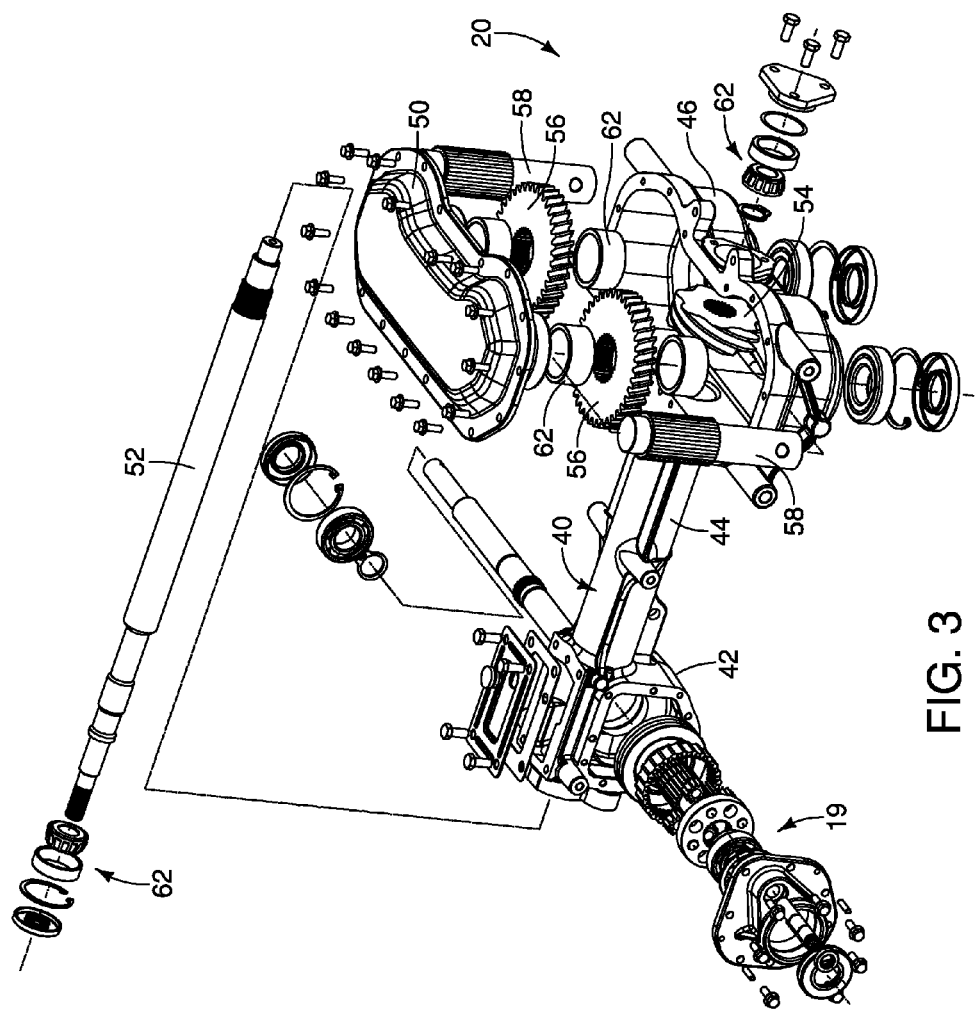
FIG. 3 is an exploded view of a transfer casing, transmission assembly, and a tiller assembly.

In the exemplary embodiment of the vertical tine tiller 10 shown in FIGS. 1-2, the transmission assembly 19 is operatively connected to the rear of the frame 14. The transmission assembly 19 is configured to drive the wheels 16 forwardly or rearwardly to move the vertical tine tiller 10. The transmission assembly 19 receives the rotational output from the power source 12, and transfers that rotational output into rotation of the wheels 16 through a series of gears. The transmission assembly 19 includes a plurality of gears and drivetrains, as shown in FIG. 3. In other embodiments, the vertical tine tiller 10 does not include a transmission assembly 19 and instead is moved forwardly and rearwardly by the operator.

Figure 4:
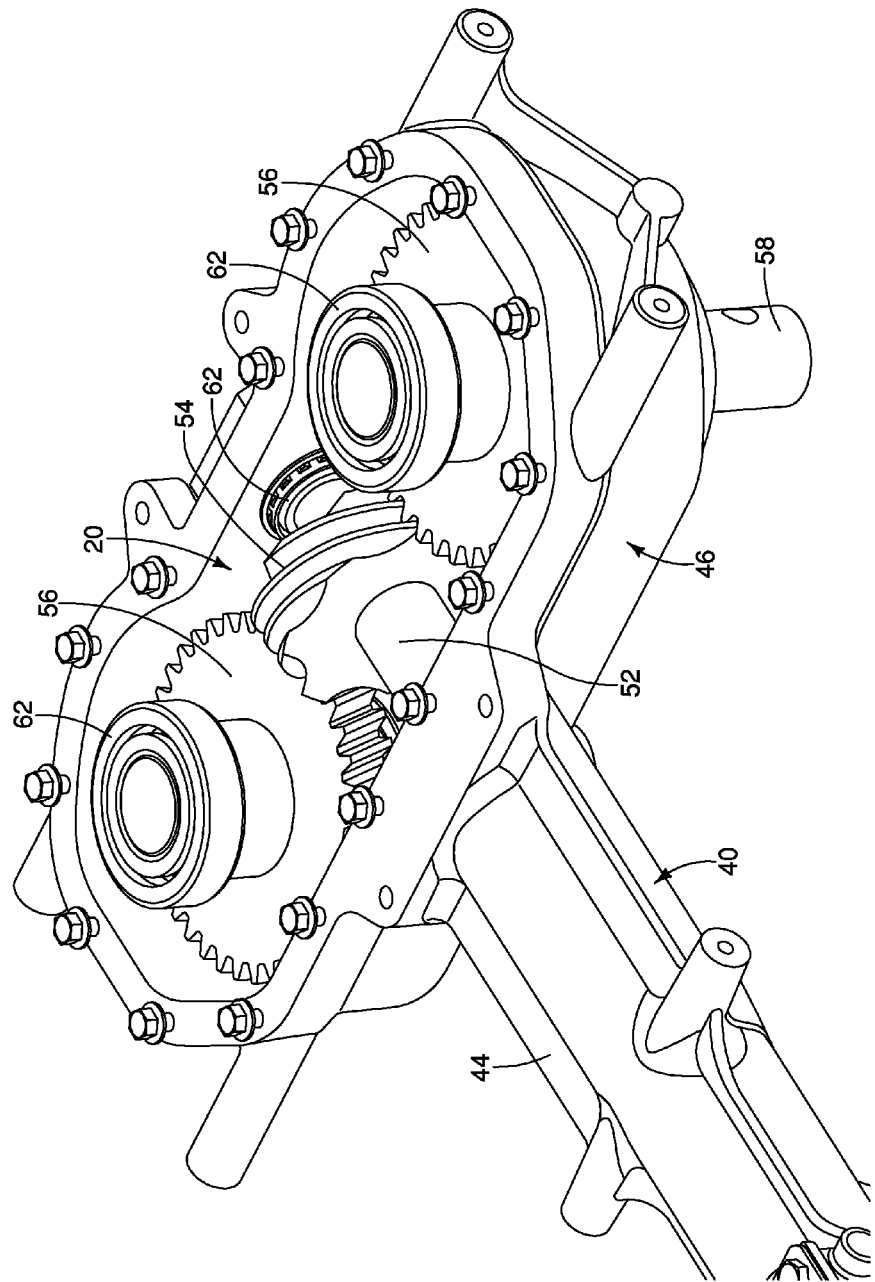
FIG. 4 is a top perspective view of a portion of the tiller assembly shown in FIG. 3.
Figure 5A:
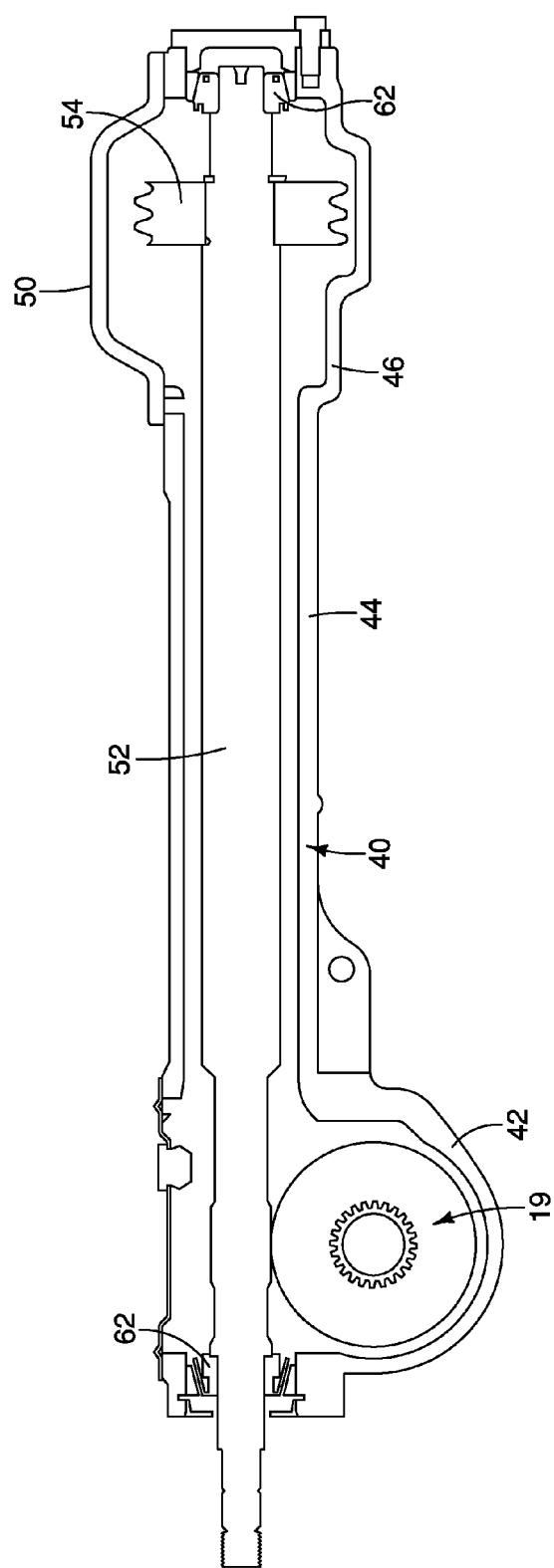
FIG. 5A is a side cross-sectional view of a portion of the tiller assembly.
Figure 5B:
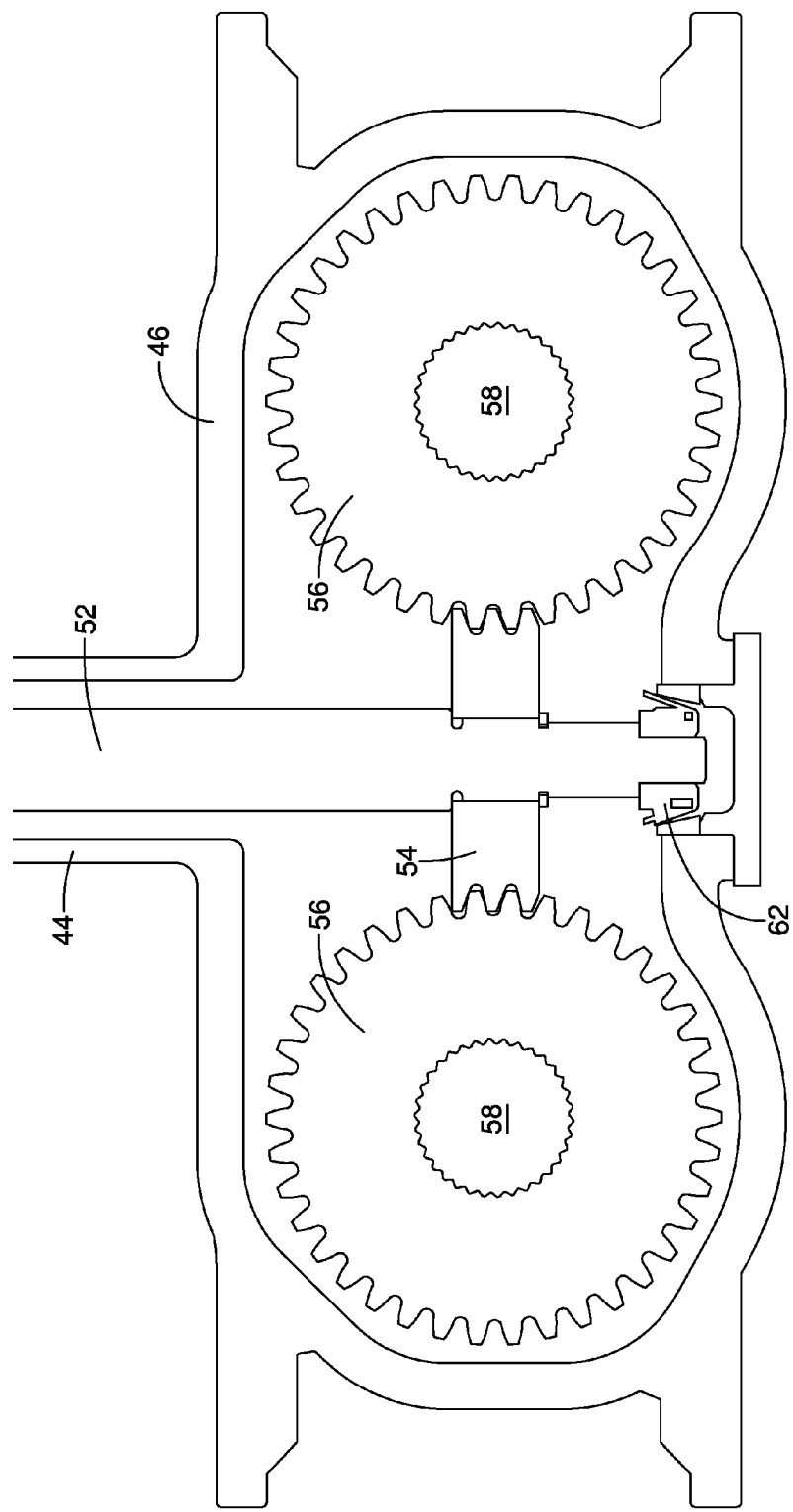
FIG. 5B is a top view of a portion of the tiller assembly.
Figure 5C:
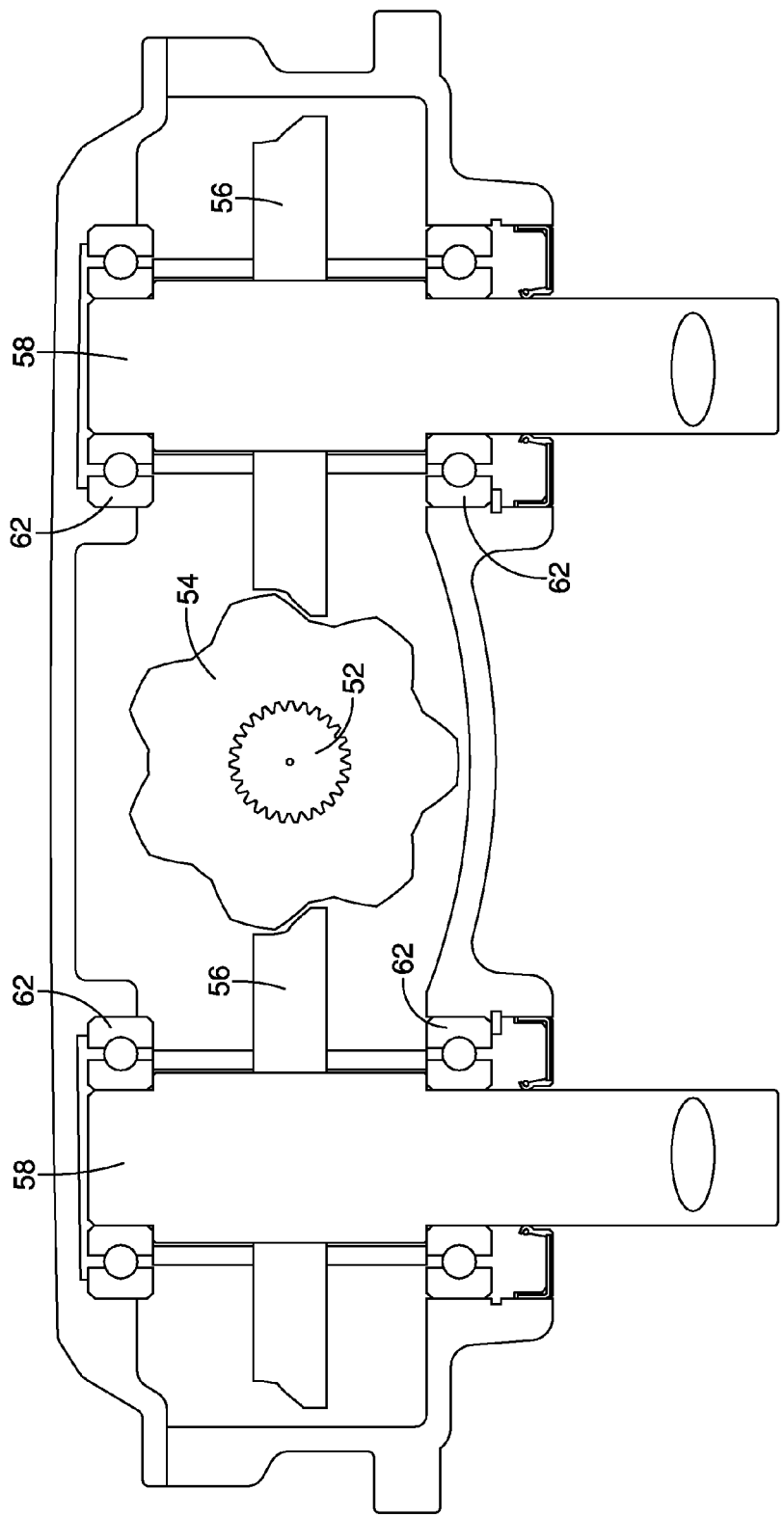
FIG. 5C is a front view of a portion of the tiller assembly.
Figure 5D:
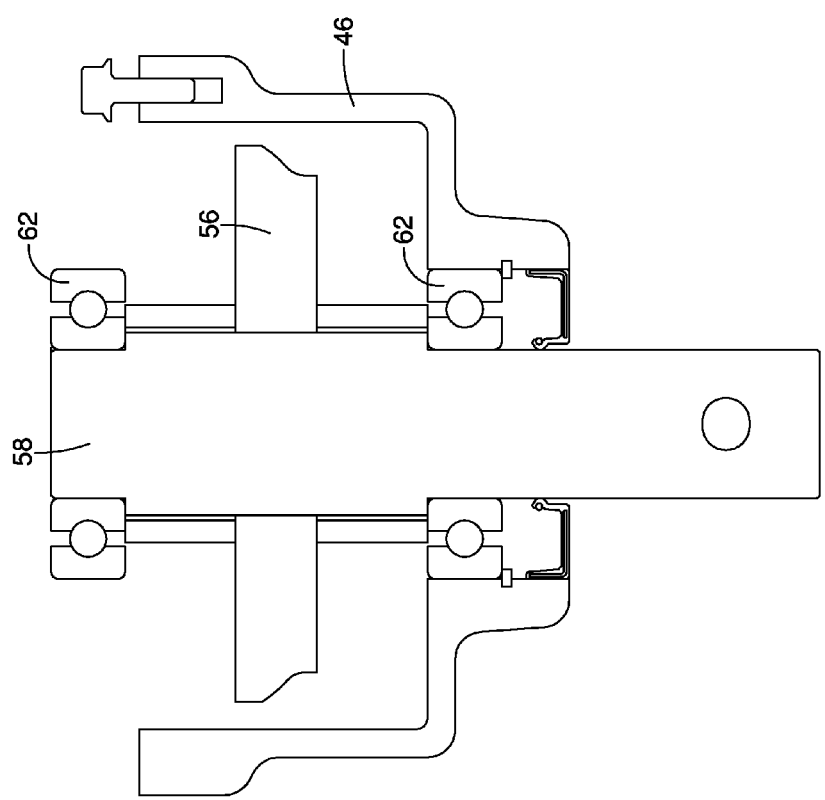
FIG. 5D is a side view of a portion of the tiller assembly.

The illustrated embodiment of the vertical tine tiller 10, as shown in FIGS. 2-4, includes a transfer casing 40 attached to the frame 14. In an embodiment, the transfer casing 40 extends rearwardly from the frame 14 and at least partially contains the transmission assembly 19 and the tiller assembly 20. The transfer casing 40 can be formed of a single molded member that includes a transmission housing 42, a tubular housing 44, and a power head housing 46. In another embodiment, the transmission housing 42, tubular housing 44, and power head housing 46 are formed as separate members and fixedly attached to each other via welds and/or mechanical connectors. The transfer casing 40 is configured to provide support and a foundation for the transmission assembly 19 and the tiller assembly 20.

As shown in FIGS. 3-4, the transmission housing 42 of the transfer casing 40 is a generally rectangular housing into which the components of the transmission assembly 19 are secured. The wheel axle(s) 48 that are driven by the transmission assembly 19 extend laterally from the transmission housing 42, thereby allowing the wheels 16 to be attached thereto. The tubular housing 44 extends rearwardly from the transmission housing 42, and the power head housing 46 extends rearwardly from the tubular housing 44. A cap 50 is attached to the power head housing 46 to enclose the components of the tiller assembly 20 located therein.

In an embodiment, the tiller assembly 20 includes a driveshaft 52, a transfer gear 54, a pair of drive gears 56, a pair of drive rods 58, and a pair of tine assemblies 60, as shown in FIGS. 2-4. The tiller assembly 20 is operatively connected to the frame 14 by way of the transfer casing 40. The tiller assembly 20 extends rearwardly from the frame 14, which allows the operator to not only control the direction of movement of the vertical tine tiller 10 using the operator control assembly 18 but also control the depth that the tine assemblies 60 are inserted into the ground being worked. By having the tiller assembly 20 extend rearwardly, thereby locating the tine assemblies 60 below the operator control assembly 18, it is easier for the operator to push downwardly grips 24 which results in the tine assembly 60 penetrating deeper into the ground.

The driveshaft 52 is an elongated shaft that is rotatable relative to the transfer casing 40, as shown in FIGS. 2-4 and 5A-5D. At least a portion of the driveshaft 52 extends forwardly from the transfer casing 40 to allow the driveshaft to be operatively connected to the power source 12. In an embodiment, a first end of the driveshaft 52 is driven by a belt-and-pulley connection with the rotational output of the power source 12, which provides for an indirect rotational transfer to the driveshaft 52 from the power source 12. In another embodiment, the first end of the driveshaft 52 is coupled to the crankshaft (not shown) of the power source 12 for direct rotational transfer to the driveshaft 52. The driveshaft 52 is substantially horizontally aligned within the transfer casing 40. The driveshaft 52 is configured to rotate about is longitudinal axis, which is similarly horizontally oriented. The driveshaft 52 is positively positioned within the transfer casing 40 by way of bearings adjacent to the forward end of the transfer casing (in the transmission housing 42) as well as adjacent to the rearward end (in the power head housing 46). In an embodiment, the driveshaft 52 engages the transmission assembly 19 via worm gear that is formed into the outer circumferential surface of the driveshaft 52. The worm gear connection on the driveshaft 52 (FIG. 5A) transfers the longitudinal (horizontal) rotation of the driveshaft 52 into lateral (horizontal) rotation of the wheel axles 48, thereby driving the wheels 16. In an embodiment, the engagement between the driveshaft 52 and the transmission assembly 19 is by way of selective engagement in which the operator selectively causes the engagement/disengagement. In another embodiment, the engagement between the driveshaft 52 and the transmission assembly 19 is continuous.

As shown in FIGS. 3-4 and 5A-5D, a transfer gear 54 is coupled to the second end of the driveshaft 52. In an embodiment, the transfer gear 54 is formed as a circular disc that includes an aperture formed through the thickness thereof, wherein the surface of the aperture forms a splined surface. The driveshaft 52 includes splines formed into a portion of the outer surface thereof, wherein the splines of the transfer gear 54 mesh and correspond to the splines of the driveshaft 52 to provide a meshed coupling between the transfer gear 54 and the driveshaft 52. The meshed coupling between the transfer gear 54 and the driveshaft 52 effectively provides a singular member that is horizontally rotatable—or rotatable about a horizontally-aligned axis of rotation. In another embodiment, the transfer gear 54 is fixedly attached to the driveshaft 52 by welding. In yet another embodiment, the transfer gear 54 and driveshaft 52 are formed as a single member. The outer circumferential surface of the transfer gear 54 includes a plurality of gear teeth that form a worm gear in which the gear teeth extend from the outer circumferential edge in a helical manner. The transfer gear 54 is configured to rotate simultaneously with the driveshaft 52 such that the rotation of the driveshaft 52 is transferred to the drive rods 58 by way of the transfer gear 54.

The transfer gear 54 is configured to be in meshing engagement with a pair of drive gears 56 positioned on opposite sides of the transfer gear 54, as shown in FIGS. 3-4 and 5A-5D. Each of the drive gears 56 is formed as a substantially circular, disc-shaped pinion gear in which the gear teeth that extend radially outward from the outer circumferential surface of the drive gear 56 and are parallel to the rotational axis of the drive gear 56. The transfer gear 54 and drive gears 56 allow the transfer of rotation about a horizontal axis of rotation of the driveshaft 52—or horizontal rotation—to be directly transferred to rotation about a vertical axis of rotation of each of the drive rods 58—or vertical rotation. Each drive gear 56 has a central aperture formed through the thickness along the longitudinal axis thereof, and the surface forming the aperture includes a plurality of splines. The splines of the aperture of each drive gear 56 mesh with and correspond to splines formed on the outer surface of the drive rod 58 to which the drive gear 56 is coupled. Although the spline-spline connection between the drive gear 56 and the corresponding drive rod 58 is shown and described herein, it should be understood by one having ordinary skill in the art that any other mechanical fastening mechanism can be used to connect each drive gear 56 to a drive rod 58.

Each of the drive gears 56 is coupled to a corresponding drive rod 58, as shown in FIGS. 5A-5D. The drive rods 58 are vertically-aligned, elongated members having a tubular shape. As explained above, splines are formed into a portion of the outer circumferential surface of the drive rod 58 to mesh with the splines of the drive gear 56 to provide a positive coupling between the members. The coupling of the transfer gear 54 to the driveshaft 52 and the coupling of the drive gears 56 to the drive rods 58—in combination with the meshing engagement between the transfer gear 54 and the drive gears 56—allows for the direct transfer of horizontal rotation of the driveshaft 52 to vertical rotation of the drive rods 58. In another embodiment, a tubular sleeve having an inner diameter substantially the same as the outer diameter of the drive rod 58 is attached to the drive rod 58, wherein the sleeve includes splines forming the outer circumferential surface thereof to be engaged with the splines of a drive gear 56. The splines of the drive rod 58 are aligned with the longitudinal (vertical) rotational axis. The portion of each drive rod 58 having the splines is positioned within the power head housing 46, and a portion of each drive rod 58 extends downwardly from the power head housing 46 in a substantially vertical manner. A tine assembly 60 is attached to the portion of each drive rod 58 extending from the power head housing 46.

Figure 7:
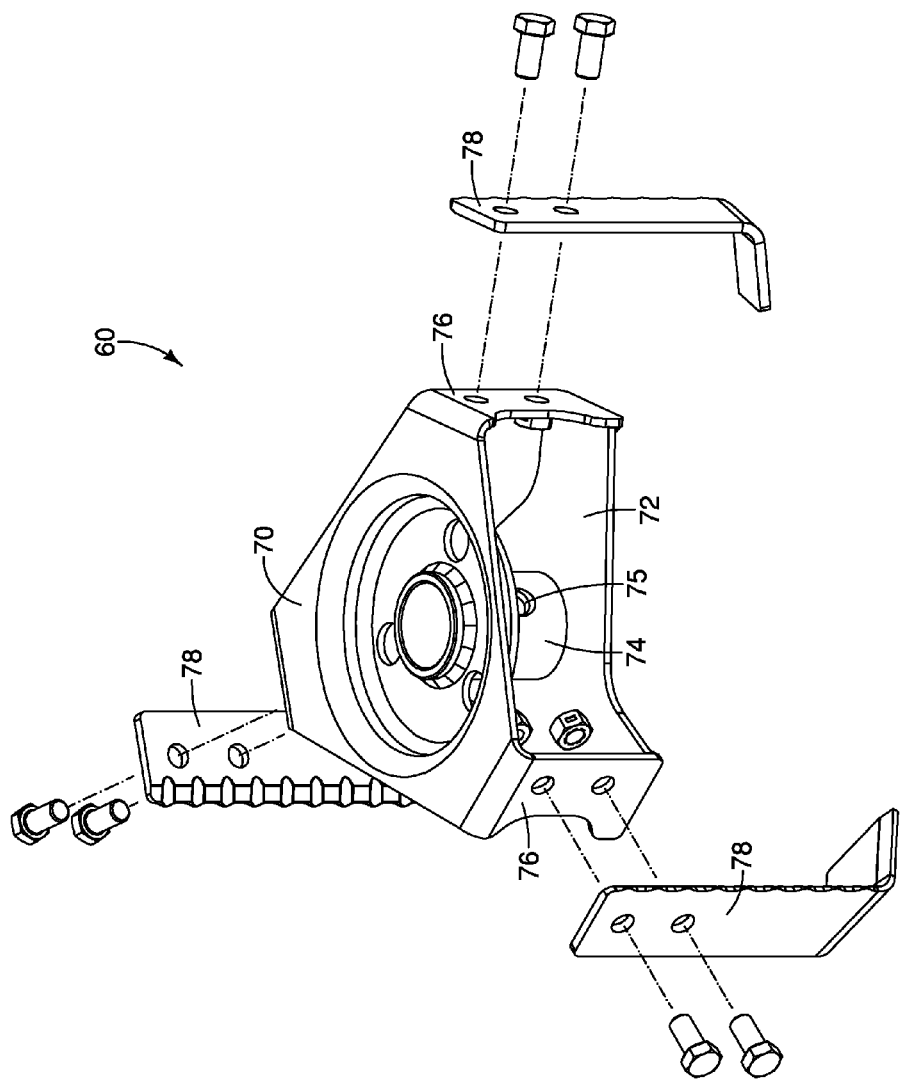
FIG. 7 is an exploded view of a tine assembly.
Figure 8A:
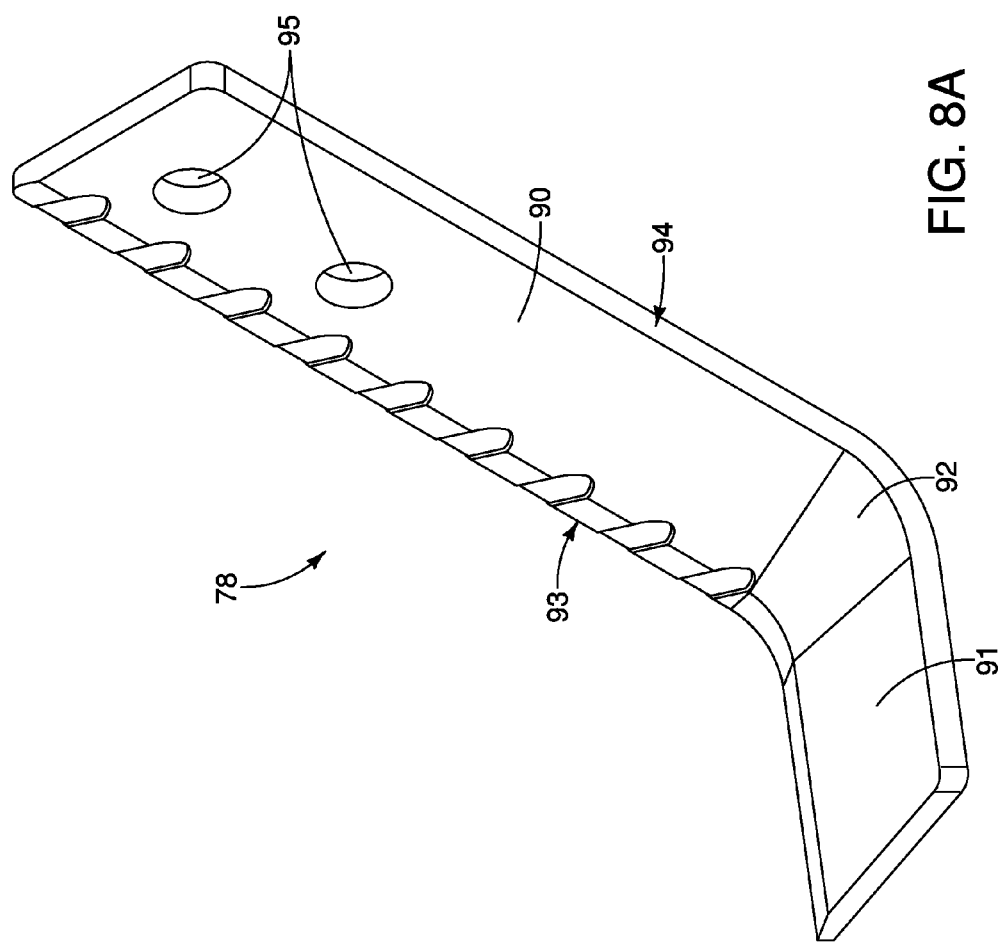
FIG. 8A is a perspective view of an exemplary embodiment of a tine.

Referring to FIGS. 6A-6B and 7, an exemplary embodiment of a pair of vertically-oriented tine assemblies 60 are shown. FIGS. 6A-6B show a pair of tine assemblies oriented as they would be attached to the drive rods 58. In particular, as shown in FIG. 6B, the orientation of the tine assemblies 60, when connected to the drive rods 58, is offset such that the tines 78 of one tine assembly 60 do not interfere with the tines of the adjacent assembly during operation of the tiller 10. Each tine assembly 60 includes an upper plate 70, a lower plate 72, a hub 74, a plurality of mounting brackets 76, and a plurality of tines 78. In an embodiment, the upper plate 70, lower plate 72, hub 74, and mounting brackets 76 are formed separately and fixedly attached to each other. In other embodiments, the upper plate 70, lower plate 72, hub 74, and mounting brackets 76 are formed as a single member by way of a casting, stamping, or the like. In the illustrated embodiment, the upper plate 70 and the plurality of mounting brackets 76 are formed from a single stamped piece of metal to produce the mounting brackets 76.

In an embodiment, the upper plate 70 and the mounting brackets 76 of each tine assembly 60 are formed as an integral member, wherein the lower plate 72 and hub 74 are fixedly attached thereto by welding or other similar means of attachment, as shown in FIGS. 6A-6B and 7. The upper plate 70 is formed of a substantially planar portion having a depressed central region and the planar portion includes a plurality of lobes extending from the central region. In the illustrated embodiment, the upper plate 70 includes three (3) lobes, forming a generally triangular member wherein the lobes are truncated corners of a triangle. In the illustrated embodiment, a mounting bracket 76 extends downwardly from each of the lobes, wherein the mounting brackets 76 are formed such that there is a curved surface between the upper plate 70 and the mounting brackets 76. The depressed central region of the upper plate includes an aperture formed therethrough, wherein the hub 74 is received within the aperture and fixedly attached thereto. In other embodiments, the substantially planar central portion does not include a depressed central region, and instead, includes only an aperture for receiving the hub 74 therewithin.

The hub 74 of each tine assembly 60 is a generally cylindrical member extending between the upper and lower plates 70, 72, as shown in FIGS. 6A-6B and 7. The hub 74 includes an aperture 75 formed through both of the opposing side walls thereof, wherein the pair of apertures 75 are aligned perpendicular to the longitudinal axis of the hub 74. The apertures 75 are configured to receive an attachment mechanism 80, such as a bolt 81 and nut 82 with threaded engagement therebetween, or other mechanical fastening device to operatively connect each tine assembly 60 to a drive rod 58 extending downwardly from the power head housing 46. The attachment mechanism 80 is removable or otherwise detachable to allow for the entire tine assembly 60 to be disconnected from the drive rod 58 for repair or replacement.

The lower plate 72 of the tine assembly 60 is formed in a similar shape to the upper plate 70, as shown in FIGS. 6A-6B and 7. The lower plate 72 is oriented substantially parallel with the upper plate 70 and is fixedly attached to the hub 74 by welding or by any other fixed attachment manner. The lower plate 72 is a generally triangular shape in which each of the corners of the lower plate 72 extend radially outward from the hub 74 and are connected to a corresponding mounting bracket 76 that extend downwardly from the upper plate 70. Each of the three corners of the lower plate 72 is fixedly attached to a mounting bracket 76 by welding.

A vertically-oriented tine 78 is releasably attachable to each of the mounting brackets 76, as shown in FIGS. 6A-6B and 7. In the illustrated embodiment, each tine assembly 60 includes three tines 78 that are oriented generally vertically and extend downwardly from the mounting bracket 76. The downwardly-directed vertical tines 78 are plunged into the ground while rotating to break up the dirt and rocks.

As shown in FIGS. 8A-8D, an exemplary embodiment of a tine 78 is provided. The tine 78 includes an upper portion 90 and a lower portion 91 that is connected to the upper portion 90 by way of a transition portion 92. The lower portion 91 is angled with respect to the upper portion 90 in two directions. The tine 78 includes a leading edge 93 and an opposing trailing edge 94. The upper portion 90 includes a plurality of apertures 95 that allow the tine 78 to be releasably attachable to a mounting bracket 76 for ease of removal for repair or replacement. The upper portion 90 is an elongated, flat, and generally rectangular member. The transition portion 92 extends from the lower end of the upper portion 90 at a compound angle, wherein the transition portion 92 is angled relative to the longitudinal axis of the upper portion 90 as well as rotated about the longitudinal axis which allows the lower portion 91 to be directed into the ground. The lower portion 91 extends continuously from the transition portion 92.

The leading edge 93 of the tine 78 is sharpened and configured to be a cutting edge that cuts into the ground to dig and separate the ground, dirt, and rocks, as shown in FIGS. 8A-8D. It should be understood by one having ordinary skill in the art that the sharpened leading edge 93 does not need to be sharpened to razor sharpness, but can have a narrowed thickness that forms a "sharper" edge. The leading edge 93 is angled, or otherwise formed as a sharpened edge. At least a portion of the leading edge 93 further includes a scalloped edge. In the illustrated embodiment, the leading edge 93 of the upper portion 90 is scalloped, and the leading edge of the transition portion 92 and lower portion 91 do not include the scalloped. However, it should be understood by one having ordinary skill in the art that the entire leading edge 93 or any portion thereof can be scalloped. The scalloped leading edge provides a cutting edge that aids in keeping mud or wed dirt from caking onto the tine 78 which would otherwise dull or reduce the efficiency of the tine 78 during operation.

In operation, the power source 12 produces a rotational output, which is transferred to the driveshaft 52, thereby causing the driveshaft 52 to rotate about the longitudinal axis thereof. As the driveshaft 52 rotates, the transfer gear 54 coupled to the driveshaft 52 rotates in a similar manner. The driveshaft 52 also selectively drives the transmission assembly 19 that is operatively coupled to the driveshaft 52. The transfer gear 54 is configured to rotate about the longitudinal axis of the driveshaft 52, which is horizontally oriented. As the transfer gear 54 rotates, the rotation is transferred to the pair of opposingly-positioned drive gears 56 through a meshing engagement with the transfer gear 54. The rotation of the transfer gear 54 about a horizontally-aligned axis is transferred to rotation of the drive gears 56 about a vertically-aligned axis of the drive rods 58. Because the drive gears 56 are coupled to the drive rods 58, rotation of the drive gears 56 causes rotation of the drive rods 58 about the vertically-aligned longitudinal axis of the drive rods 58. As the drive rods 58 rotate, such rotation drives the tine assemblies 60 about the vertically-aligned longitudinal axis of the drive rods 58. The rotation of the tine assemblies 60 cuts up, digs, grinds, tills, or otherwise works the soil into which the tine assemblies 60 are disposed.

While preferred embodiments of the present invention have been described, it should be understood that the present invention is not so limited and modifications may be made without departing from the present invention. The scope of the present invention is defined by the appended claims, and all devices, processes, and methods that come within the meaning of the claims, either literally or by equivalence, are intended to be embraced therein.

What is claimed is:

1. A vertical tine tiller comprising:
   a frame;
   an operator control assembly extending from said frame;
   a power source for generating a rotational output, said power source operatively connected to said frame;
   a transfer casing operatively connected to said frame, said transfer casing being a single member;
   a tiller assembly being rotatably driven by said power source, said tiller assembly including a horizontally rotatable driveshaft operatively connected to power source, a pair of vertically-oriented drive rods rotatable about separate vertical axes and operatively connected to said driveshaft, and a vertically-oriented tine assembly operatively connected to each of said drive rods; and
   a transmission assembly in direct engagement with said driveshaft within said transfer casing for driving said transmission assembly, wherein said transmission assembly is selectively actuatable;
   wherein horizontal rotation of said driveshaft is directly transferred into vertical rotation of said drive rods within said transfer casing; and
   wherein a portion of said driveshaft and a portion of each of said pair of drive rods being disposed within said transfer casing, and rotation of said driveshaft is transferred to said drive rods within said transfer casing.

2. The vertical tine tiller of claim 1, wherein said transmission assembly is operatively connected to a plurality of wheels.

3. The vertical tine tiller of claim 1 further comprising a transfer gear coupled to said driveshaft and a drive gear attached to each of said drive rods, wherein said transfer gear is meshingly engaged with said drive gears for transferring rotation from said driveshaft to said drive rods.

4. The vertical tine tiller of claim 3, wherein said transfer gear is a worm gear and said drive gears are pinion gears.

5. The vertical tine tiller of claim 4, wherein each of said transfer gear and said drive gears includes an aperture having splines formed on a surface defining said aperture, said splines engage corresponding splines formed on said driveshaft and said drive rods, respectively, for coupling said transfer gear to said drive shaft and for coupling said drive gears to said drive rods.

6. The vertical tine tiller of claim 1, wherein said tine assembly includes a plurality of vertically-oriented tines.

7. The vertical tine tiller of claim 6, wherein each of said tines includes an upper portion, a lower portion extending from said upper portion, said tine also having a sharpened leading edge.

8. The vertical tine tiller of claim 7, wherein at least a portion of said sharpened leading edge of each tine is scalloped.

9. A vertical tine tiller comprising:
   a frame;
   an operator control assembly extending rearwardly from said frame;
   a power source for generating a rotational output, said power source operatively connected to said frame;
   a driveshaft operatively connected to said power source for receiving said rotational output therefrom;
   a transfer casing operatively connected to said frame, said transfer casing being a single member;
   a tiller assembly operatively connected to said frame wherein said tiller assembly extends rearwardly from said frame, said tiller assembly being rotatably driven by said power source, said tiller assembly including a pair of vertically rotatable drive rods, and a tine assembly operatively connected to each of said drive rods, wherein each of said tine assemblies being rotatable about a substantially vertical axis;
   a transmission assembly in continuous and direct engagement with said driveshaft, wherein said transmission assembly is selectively actuatable;
   a pair of rotatable wheels operatively connected to said frame, said pair of wheels being selectively driven by said transmission assembly;
   wherein a portion of said driveshaft, a portion of each of said pair of drive rods, and a portion of said transmission assembly are positioned within said transfer casing, and rotation of said driveshaft is transferred to said drive rods and said transmission assembly within said transfer casing.

10. The vertical tine tiller of claim 9, wherein rotational output of said power source generates horizontal rotation of said driveshaft which is transferred into vertical rotation of said drive rods.

11. The vertical tine tiller of claim 9, wherein a transfer gear is coupled to said driveshaft and a drive gear is coupled to each of said pair of drive rods, said transfer gear being meshingly engaged with said drive gears to transfer rotation of said driveshaft to said drive rods.

12. The vertical tine tiller of claim 11, wherein said transfer gear is a worm gear and said drive gears are pinion gears.

13. The vertical tine tiller of claim 9, wherein said tine assemblies are located below said operator control assembly.

* * * * *